Sept. 30, 1958

S. W. TORODE 2,854,577

INTEGRATOR

Filed Sept. 18, 1945

INVENTOR.
STANLEY W. TORODE

BY
ATTORNEY

Sept. 30, 1958 S. W. TORODE 2,854,577
INTEGRATOR
Filed Sept. 18, 1945 2 Sheets-Sheet 2

INVENTOR.
STANLEY W. TORODE
BY *Joseph Chappell*
ATTORNEY

United States Patent Office 2,854,577
Patented Sept. 30, 1958

2,854,577
INTEGRATOR

Stanley W. Torode, Arlington, Mass., assignor, by mesne assignments, to the United States of America as represented by the Secretary of the Navy Application September 18, 1945, Serial No. 617,155

1 Claim. (Cl. 250—27)

This invention relates in general to the field of electrical integrator circuits, and more particularly concerns those integrating circuits adapted to provide continuous output voltage instantaneously proportional to the range of an object.

Associated with radio echo detection apparatus is the problem of automatic tracking. Briefly, this problem is that of detecting a target which is moving or stationary and utilizing the video signal derived from a returning echo to generate an electrical voltage the magnitude of which is an indication of the target range. In such range systems two narrow, rectangular voltage gates, are so arranged in time as to correspond with the range of the target and thus coincide with the video signal. These rectangular voltage pulses are known as tracking gates and are delayed in time with respect to each other by a small but predetermined amount.

The coincidence of the received echo signal or video pulse and the two tracking gates is used to produce two signals whose amplitude and energy are dependent upon the relative position of each gate with respect to the echo signal. Proper tracking is indicated when the signal is kept positioned between the two tracking gates. Motion of the video signal with respect to the gates will alter the output due to coincidence, and the extent of the change is an indication of the rate and direction of target motion. An integrating circuit is utilized to supply an output voltage, the change of which is dependent upon the unbalance condition of the coincidence circuit outputs, and in turn is used to position the gates with respect to time so that equilibrium is retained. In this manner, the tracking gates follow the signal and the integrator output provides a constant indication of target range.

From the standpoint of sensitivity and accuracy the automatic tracking systems heretofore utilized have been inadequate, inasmuch as they failed to produce a sufficiently large voltage change while tracking through the range variation possible for a particular equipment. It has thus been essential on certain ranges to employ direct current amplifiers so that the output voltage could successfully be used to control the tracking gate positioning circuit.

It is therefore an object of my present invention to provide a novel, improved circuit for automatically generating a substantially steady voltage proportional to the range of a target and having inherent high sensitivity and accuracy.

Another object of my invention is to provide an integrating circuit adaptable to conventional double gate range tracking radio echo detection circuits for providing accurate, continuous information in the form of a steady voltage instantaneously proportional to the range of a target.

A further object of my invention is to provide a simplified and stabilized integrating circuit for use with a double gate range tracking radio echo detection circuit, wherein the generated range indicating voltage is capable of instant change to permit following a rapidly moving target.

These and other objects of my invention will now become apparent from the following detailed specification taken in connection with the accompanying drawing in which.

Figure 1:
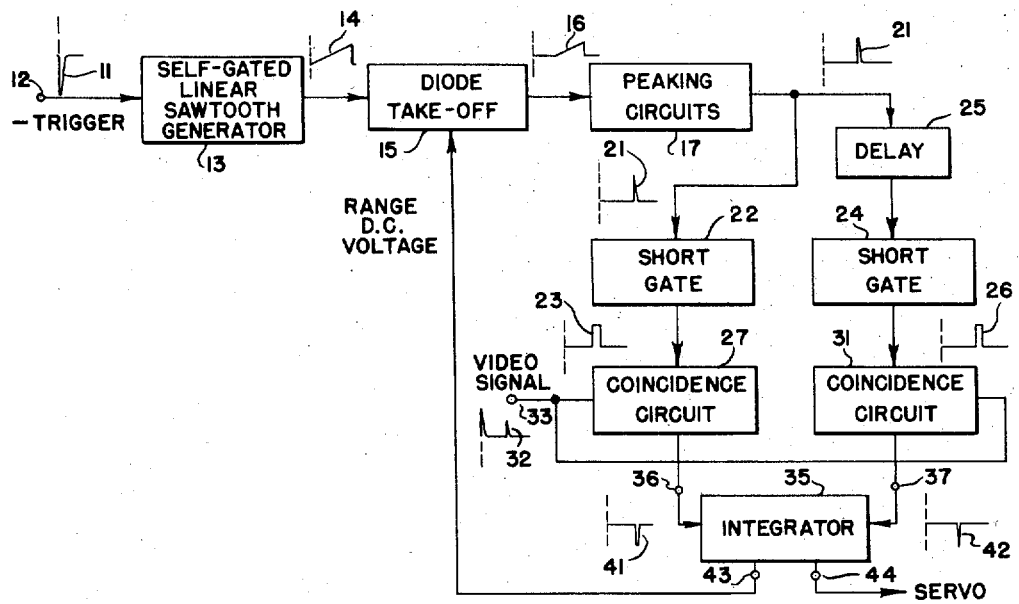
Fig. 1 is a generalized and simplified block diagram of a radio echo detection tracking system utilizing the basic circuit contained in this disclosure.

In radio echo detection apparatus, a succession of high energy electrical impulses are transmitted. Arrangement is made to receive a corresponding succession of echo pulses, known also as video pulses when detected from the target and to measure the time elapsed between the transmitted and received signals. With a system of this general nature as a basis for signals, reference is now made to Fig. 1 for a discussion of the particular use thereof for automatically tracking the target producing an echo. As illustrated, a succession of sharp negative trigger pulses 11 are applied to the circuit at terminal 12, and are derived from the pulse generating circuits so that the leading edge of trigger 11 corresponds in time with the leading edge of the pulse of transmitted high frequency energy. The negative trigger pulses 11 are applied to a self-gated, linear sawtooth generator 13 which comprises essentially a circuit for developing, when triggered, an extremely linear rise sawtooth voltage 14 extending over a predetermined period of time. The initiation of the sawtooth voltage wave form 14 corresponds exactly in time with the leading edge of the transmitted pulse.

The sawtooth voltage 14 is applied to one electrode of a diode take-off circuit 15 along with a substantially steady voltage, proportional to the range of the target and generated in a manner to be hereinafter described. The take off circuit 15 comprises a normally non-conducting diode which remains thus until the applied sawtooth voltage 14 exceeds the applied range voltage, whereupon conduction is initiated. The diode then passes a signal for a short period of time, which corresponds to the continued rise of the sawtooth voltage from the point of coincidence of the two aforementioned voltages. The signal output of the diode take-off circuit 15 is illustrated by wave form 16, which is sawtooth in shape but delayed from the zero time axis by an amount proportional to the range voltage applied to the take-off circuit.

The triangular pulse of voltage 16 is applied to a peaking and limiting circuit 17, which as is well understood, amplifies and clips the signal so that the leading edge thereof is of greatly increased slope. After sufficient steepening of the voltage wave front, the signal is differentiated, thereby generating a sharp positive trigger 21 occurring at a time corresponding to the beginning of conduction of the diode take-off circuit 15. The time delay of the sharp pulse 21 from the zero reference time is thereby proportional to the range of the target.

The triggering impulse 21 is applied to a circuit which utilizes the leading edge thereof for the generation and slight displacement of two short rectangular voltage gates. This double gate generator may assume various forms. In the embodiment illustrated, the trigger pulse 21 is applied directly to short gate generator 22 providing the rectangular output gate 23. In addition, the trigger impulse 21 is applied to a similar short gate generator 24 through a time delay circuit 25 so that the output rectangular gate 26 is displaced in time from the gate 23 by a small predetermined amount. Preferably the gates 23 and 26 are of a time duration substantially equal to one-half the time of a transmitted impulse and are so arranged by the action of time delay circuit 25 that the leading edge of rectangular gate 26 corresponds with the trailing edge of rectangular gate 23.

The double and time displaced gates 23 and 26 are applied to a corresponding pair of coincidence circuits 27 and 31 along with the received target echo or video signal 32, introduced into the circuit of Fig. 1 at terminal 33. As is well understood, a coincidence circuit is one which permits conduction only at a time when a pair of applied signals are coincidentally in phase. In a particular embodiment thereof, a pentode electron discharge tube may be used as a coincidence amplifier and is arranged so that the short gate rectangular voltage is applied to the suppressor grid thereof, while the video input is applied to the control grid thereof. During that time when the video signal and the gate signal overlap, the coincidence pentode conducts.

In Fig. 1, the output signals of the coincidence circuits 27 and 31 are applied to an integrator circuit 35, at terminals 36 and 37 respectively in the form of sharp negative impulses 41 and 42. The relative area under the impulses 41 and 42, and hence the relative energy content thereof, is dependent upon the manner in which the video signal 32 straddles the double rectangular voltage gates 23 and 26 in time. For example, if the center of the video signal corresponds with the overlapping edge of the double voltage gates 23 and 26 the coincidence circuits 27 and 31 will feed equal energy pulses 41 and 42 to the integrator 35. If the axis of the video pulse shifts relative to the overlapping edge of the double voltage gates 23 and 26, then the coincidence pulse output signals 41 and 42 will differ by an amount which is dependent upon the amount of the aforementioned displacement. Such a displacement is indicative of a target movement in a particular direction, and it is the function of the integrator circuit 35 which is the subject of this present disclosure to provide a substantially uniform output voltage which is directly proportional to the range of the target. This output voltage appears at terminals 43 and 44 of the integrator and is coupled from terminal 43 to the diode take-off circuit so that the displaced initiation of triangular voltage signal 16 is proportional in time to the range of the target. A shift of the video impulse signal 32 in time with respect to the double voltage gates 23 and 26 will thereby alter the voltage output of the integrator 35 which upon application to the diode take-off circuit tends to reestablish equilibrium by proper movement of the double gate initiating trigger 21. The range output voltage appearing at terminal 44 is coupled to a servo mechanism to develop a mechanical output proportional to range. As an example, this mechanical output may be utilized to position properly a lead computing sight in a fire control system.

The operation of a particular integrator circuit will now be discussed in connection with Fig. 2, wherein terminals 36 and 37 are the input terminals for the pulses generated in the coincidence circuits 27 and 31. Terminals 43 and 44 correspond with the output terminals described in connection with Fig. 1. The succession of sharp negative trigger pulses generated in the coincidence circuits are coupled to the cathodes of two diode rectifiers 51 and 52 through capacitors 53 and 54, respectively. Associated with the diodes is an integrating capacitor 55, grounded at one terminal thereof, and connected to the control grid of a cathode follower 56 at the other terminal. The cathode of diode 51 is also connected to the plate of diode 52 through a load resistor 57. The cathodes of diode 52 and cathode follower 56 are interconnected through a load resistor 61. A fixed bias is applied to rectifier diode 51 by returning the anode thereof to a tap 60 on the cathode follower cathode load resistor 62. Diode 52 is biased by a voltage equal to the potential difference between the grid and cathode of cathode follower 56.

To obtain the required swing of output voltage from the cathode follower, the anode thereof is connected to a comparatively high positive power source and the cathode load resistor is returned to a negative power supply. The output of the cathode follower 56 is taken between the cathode thereof and ground and is divided by two series resistors 64 and 65. The full output voltage appearing at terminal 43 is, as previously mentioned in connection with Fig. 1, used to determine the delay of the diode take-off circuit 15 of Fig. 1, and the reduced range output voltages appearing at terminal 44 is used as the control for a suitable servo mechanism. Smoothing and blocking capacitors 66 and 67 are shunted to ground from the cathode of cathode follower 56 and the anode of rectifier 51 respectively.

In operation when the received video signal is straddled by the double tracking voltage gates, the negative triggers applied at terminals 36 and 37 control the integrating operation. A negative pulse applied at terminal 36, driving the cathode of rectifier 51 negative, results in a current flow through the diode 51 and its load resistor 57 which tends to charge integrating capacitor 55 positively at the grid of the cathode follower 56. The termination of a sharp negative pulse at terminal 36 is followed by the application of a sharp negative pulse at terminal 37 causing conduction through rectifier 52 and associated load resistor 61 in a direction which tends to discharge the capacitor 55 or reduce the positive potential applied to the grid of cathode follower 56. The amount of charge and discharge which occurs is, of course, dependent upon the relative energy content or the area under the trigger pulses applied at terminals 36 and 37.

If the video signal is precisely straddled by the double tracking gates, the average voltage of integrating capacitor 55 will remain constant as determined by target range. As the target moves; thus resulting in a slight displacement of the video signal with respect to the tracking gates, the relative energy content of the pulses applied at terminals 36 and 37 changes with a resultant change in the voltage of capacitor 55. As the voltage appearing across capacitor 55 also appears at the grid of cathode follower 56, the output voltage at terminal 43 is substantially equal thereto. Accordingly, target movement is accompanied by a change in output voltage at terminal 43 which through the diode take-off circuit 15 of Fig. 1 adjusts the time position of the tracking gate so that equilibrium is properly reestablished and automatic tracking thereby attained. Correct design of the time constants of the diode rectifier circuits and the size of capacitor 55 provide an output range voltage which is extremely smooth and has a variation of the order of 200 volts over the range to be covered.

In many applications, it is preferable to track a video target automatically on the leading edge thereof. Such an arrangement permits tracking of a target through other and interfering targets, as for example, ground return. This condition predicates that a balance be obtained at capacitor 55 for somewhat unequal input pulses at terminals 36 and 37. For this purpose, a tracking balance control is provided in the form of an adjustable tap 60 on cathode follower resistor 62. This adjustment permits bias adjustment on rectifier 51, so that tracking may be obtained at any desired point in the video signal. It is desirable in an integrator of the type illustrated in Fig. 2 to maintain a constant bias on the diodes 51 and 52 in order to maintain a fixed tracking balance and equal tracking ability on targets moving in and out in range. A stabilizing element comprising a small neon bulb 71 or similar gas tube is connected across a portion of the cathode load resistor 62 to establish and maintain the correct balance.

Figure 2:
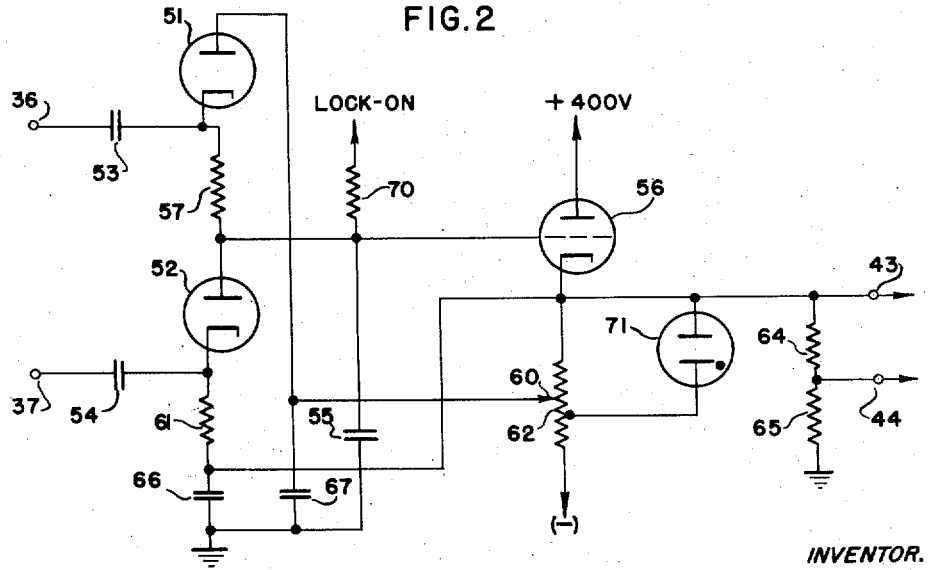
Fig. 2 is one embodiment of an integrating circuit adapted to provide information regarding the range of a rapidly moving target.

A target search feature is also included in the integrating circuit of Fig. 2. Thus if a sawtooth voltage of low frequency is applied to the control grid of the cathode follower 56 through isolating resistor 70, the output voltage at 43 sweeps the tracking gates at a regular rate through the range to be covered. As soon as the gates lock on a target, the sweep voltage or search signal generator is automatically disconnected and the output voltage becomes dependent solely on the action of the coincidence circuits. The disconnect circuit may be a relay between the search generator and integrating circuit. Provision may be made for manual adjustment of the search voltage so that selection of one out of many targets may be effected by the operator.

Figure 3:
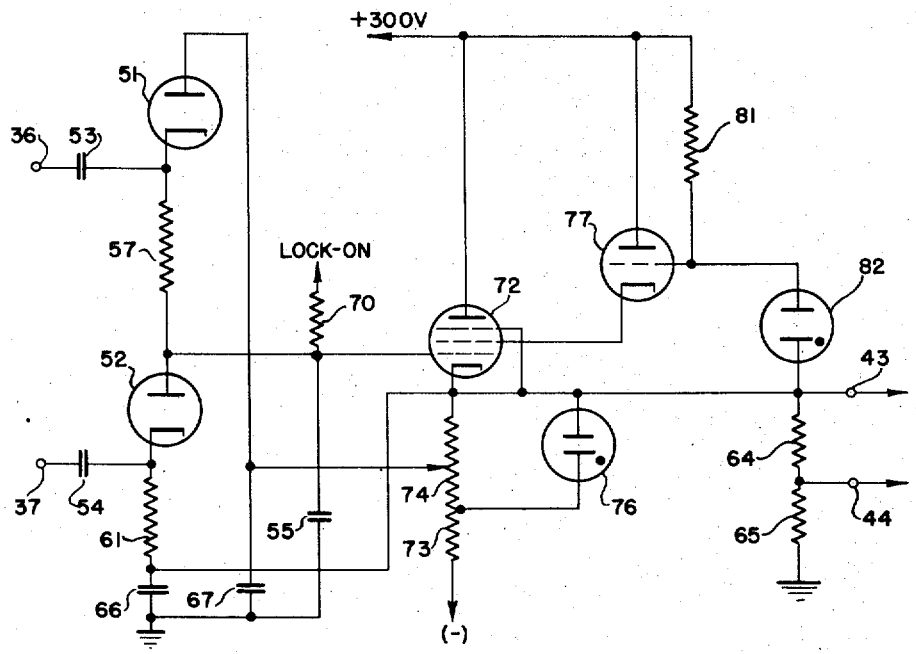
Fig. 3 is a modification and improvement of the range tracking circuit illustrated in Fig. 2, for use in a system as disclosed in Fig. 1.

In Fig. 3, there is illustrated an improved form of integrating circuit, and reference is now made thereto. The basic integrating circuit, including diode rectifiers 51 and 52 and integrating capacitor 55 are essentially the same as illustrated in Fig. 2 and as such are correspondingly numbered. The integrated voltage appearing across capacitor 55 is applied to the control grid of a pentode cathode follower 72, having a cathode load resistor 73 tapped at 74 to provide an adjustable tracking balance. The pentode plate is connected to a positive power supply and the cathode load resistor is connected to a negative power supply. The improvement in the circuit illustrated in Fig. 3 over that illustrated in Fig. 2 resides in the complete stabilization of bias potentials for the rectifier diodes. Thus a neon tube 76 or similar gas stabilizing element is shunted across a portion of the cathode load resistor 73 including the tap 74. This, as in the integrator illustrated in Fig. 2, provides some stabilization of the diode bias voltages. In a cathode follower of the type illustrated by pentode circuit 72, a variation in applied control grid voltage results in a corresponding change in cathode potential, which for a pentode would ordinarily be accompanied by considerable variation in circuit gain. To eliminate the undesirable effects thereof, the screen grid of the pentode 72 is "boot-strapped" and thereby remains at a fixed potential relative to the cathode. This is accomplished by returning the screen grid of cathode follower 72 to the positive voltage source through a triode 77. The control grid of the triode 77 is maintained at a fixed potential relative to the cathode of pentode 72 by a voltage divider comprising resistor 81 and voltage stabilizing neon tube 82.

The integrator voltage output, as in the example of Fig. 2, is taken from a voltage divider comprising resistors 64 and 65 between the cathode of pentode 72 and ground. A lock on voltage may be coupled through resistor 70 to position the gates on target by sweeping the voltage applied to the capacitor 55, as described in Fig. 2.

The overall operation of the integrator illustrated in Fig. 3 when connected into the linear saw tooth delay circuit illustrated in Fig. 1 is highly satisfactory providing a range output voltage which automatically follows the most rapidly moving target. The sensitivity of the circuit and accuracy thereof is enhanced by the extreme voltage variation obtained over the desired tracking range.

The use of the integrating circuits illustrated in Fig. 2 and Fig. 3 need not be limited solely to range tracking circuits. Various modifications of the design and specific application of these circuits may be evident to those skilled in the art. I prefer, therefore, to be bound not by the specific disclosures hereinabove set forth, but by the spirit and scope of the appended claim.

I claim:

An integrator circuit having an electrical input comprising first and second successions of electrical pulses, a capacitor, means including a first rectifier element for charging said capacitor in accordance with said first succession of pulses, means including a second rectifier element for discharging said capacitor in accordance with said second succession of pulses, a pentode electron tube cathode follower having a cathode load resistance, a bias source for one of said rectifier elements comprising a tap on said cathode load resistance, a voltage stabilizing element connected across at least a part of said cathode load resistance, said capacitor being connected as the input of said cathode follower, and a stabilizing circuit for maintaining the gain of said cathode follower at a constant predetermined value.

References Cited in the file of this patent

UNITED STATES PATENTS

| | | |
|---|---|---|
| 2,208,349 | Ulbricht | July 16, 1940 |
| 2,250,284 | Wendt | July 22, 1941 |
| 2,258,943 | Bedford | Oct. 4, 1941 |
| 2,264,151 | Reed | Nov. 25, 1941 |
| 2,432,454 | Skellett | Dec. 9, 1947 |
| 2,455,265 | Norgaard | Nov. 30, 1948 |
| 2,495,753 | Mozley | Jan. 31, 1950 |
| 2,581,211 | Sink | Jan. 1, 1952 |
| 2,628,349 | Nightenhelser | Feb. 10, 1953 |